United States Patent [19]

Parker

[11] Patent Number: 5,417,305
[45] Date of Patent: May 23, 1995

[54] FRONT SWING ARM SUSPENSION SYSTEM FOR A MOTORCYCLE

[76] Inventor: James G. Parker, 229 Anita Pl., Santa Fe, N. Mex. 87501

[21] Appl. No.: 120,278

[22] Filed: Sep. 13, 1993

[51] Int. Cl.⁶ .................................................. B62K 21/02
[52] U.S. Cl. ..................................... 180/219; 280/275
[58] Field of Search .............. 180/219; 280/275, 276, 280/283, 92; 301/66

[56] References Cited

U.S. PATENT DOCUMENTS

| 2,497,121 | 2/1950 | Fletcher | 280/261 |
|---|---|---|---|
| 4,180,280 | 12/1979 | Doveri | 280/277 |
| 4,265,329 | 5/1981 | de Cortanze | 180/219 |
| 4,523,790 | 6/1985 | Mariani | 301/66 X |
| 4,526,249 | 7/1985 | Parker | 180/219 |
| 4,727,951 | 3/1988 | Morioka et al. | 280/276 X |
| 4,741,545 | 5/1988 | Honma et al. | 280/276 X |
| 4,828,069 | 5/1989 | Hatsuyama | 180/219 |
| 4,834,412 | 5/1989 | Trema | 280/276 |
| 5,042,609 | 8/1991 | Krispler et al. | 180/219 |
| 5,156,231 | 10/1992 | Trema | 280/276 X |
| 5,249,650 | 10/1993 | Tanaka | 280/276 X |

FOREIGN PATENT DOCUMENTS

| 425755 | 5/1991 | European Pat. Off. | 280/276 |
|---|---|---|---|
| 8024610 | 5/1982 | France | |
| 1204884 | 8/1989 | Japan | 180/219 |
| 1237279 | 9/1989 | Japan | 180/219 |
| 3136996 | 6/1991 | Japan | 180/219 |
| 3281487 | 12/1991 | Japan | 180/219 |
| 3281488 | 12/1991 | Japan | 180/219 |
| 3287482 | 12/1991 | Japan | 180/219 |
| 4208686 | 7/1992 | Japan | 180/219 |
| 5105169 | 4/1993 | Japan | 180/219 |

Primary Examiner—Margaret A. Focarino
Assistant Examiner—Kevin Hurley
Attorney, Agent, or Firm—William A. Eklund

[57] ABSTRACT

A front swing arm suspension system for a motorcycle is disclosed. The system includes a single one-sided swing arm that extends around one side of the front wheel. The swing arm and an upper control arm are each connected to an upright, to which the wheel is journalled by means of a cantilevered live axle. The upright is oriented generally along the rake angle of the front wheel and extends from the wheel axle upwardly and around the front wheel to a telescopic steering tube. The lower portion of the upright is positioned inside the wheel rim so as to enable a brake disk to be splined to the live axle on the opposite side of the upright from the wheel. The swing arm and the control arm are connected to the upright by universally pivotable joints which accommodate swinging motion of the front wheel during suspension travel while also accommodating steering rotation of the wheel.

16 Claims, 5 Drawing Sheets

FRONT SWING ARM SUSPENSION SYSTEM FOR A MOTORCYCLE

BACKGROUND OF THE INVENTION

1. Field of the Invention.

The invention described and claimed herein is generally related to motorcycles. More particularly, the present invention is related to suspension and steering systems for the front wheel of a motorcycle.

2. Description Of Related Art Including Information Disclosed Under 37 CFR 1.97-1.99

For almost a century motorcycles have had a front suspension system consisting of a pair of telescoping fork tubes, to which the front wheel is journalled. The fork tubes typically contain internal spring and damping elements which absorb weight and shock loads on the front wheel. The fork tubes are typically connected at a steering head assembly, which is in turn connected to steering column that is journalled to the motorcycle frame and connected to the handlebar.

Despite the longstanding use of telescoping front fork tubes, there are well known disadvantages which are inherent in their design and use, and which cannot be entirely avoided. For example, there is the well known tendency for the motorcycle to "dive," or pitch forwardly and downwardly on hard braking. This results in an unsafe performance characteristic, particularly when it becomes necessary for a rider to brake hard while negotiating a curve.

Another design weakness derives from the fact that the fork must be extended forwardly at a "rake angle." One reason for extending the fork at a rake angle is to absorb road shocks caused by bumps, holes and other road irregularities. Road shocks caused by such obstacles have a substantial upward component of force, and in addition have a modest rearward component of force. Consequently it is desirable to extend the telescoping fork tubes at a rake angle that approximates to some extent the typical net direction of shock forces arising from road obstacles. A rake angle is also necessary to obtain a satisfactory steering bias, which is the bias that makes the motorcycle most stable with the front wheel in the straight, or unturned position; and which causes the front wheel of the motorcycle to tend to return the straight position from a turned position.

The design weakness arising from the extension of the forks at a rake angle arises from the fact that the weight load on the front wheel is a purely vertical force. As a result the internal fork seals are continuously subject to lateral stresses due to the weight load borne by the angled fork tubes, while they are also required to accommodate telescopic sliding motion of the fork tubes. This results in friction and wear of the fork tube seals.

Turning to another design aspect of motorcycles, it will be appreciated that in the conventional fork tube suspension the steering function and the suspension function are combined in the same fork tube suspension system. The result is that all weight and shock loads on the front wheel must be borne by the fork tubes, by the associated steering column, and by the head frame assembly. This results in these components of the steering system being made considerably stronger and having a considerably greater weight than would be necessary just to steer the motorcycle. Moreover, this excess weight is located high on the motorcycle and is spaced significantly from the center of gravity of the motorcycle, and as a result has an adverse effect on weight distribution and performance.

Consequently it has been recognized for some time that it would be desirable to separate the steering function from the suspension function, in much the same manner as these functions are routinely separated in automobiles and other four-wheel vehicles.

The inventor has previously disclosed a one-sided front suspension and steering system for a motorcycle, in U.S. Pat. No. 4,526,249, entitled "Front Suspension System for a Motorcycle," issued Jul. 2, 1985. That system overcomes many of the problems adverted to above. While that system has been successfully incorporated into a successful, commercially available motorcycle design, it has been limited in its application to relatively large "sport-cruiser" motorcycles, by the fact that the one-sided front arm of the suspension system is placed low on the motorcycle in order to permit its connection to the lower end of a kingpin member that supports the front wheel. As a result, the arcuate curve of the lower arm must be constructed quite large in order to accommodate the necessary range of steering motion of the wheel at its widest point. Moreover, the size of the front brake disk, which is located inside the kingpin, is to some extent limited by the size of the wheel and the space necessary to locate a brake caliper unit between the brake disk and the wheel rim.

Accordingly, it is the object and purpose of the present invention to provide an improved suspension and steering system for the front wheel of a motorcycle.

In this regard, it is also an object and purpose of the present invention to provide a front suspension system based on a one-sided swing arm mechanism, by which weight and shock loads are conveyed in a direct mechanical path between the front wheel and the center of mass located in the body of the motorcycle.

It is another object and purpose of the present invention to provide a front suspension system based on a swing arm mechanism that achieves the foregoing objectives and which also provides a wide angular range of steering motion to the front wheel.

It is yet another object and purpose of the present invention to achieve the foregoing objects and purposes in a front suspension system that has an improved capacity to utilize a conventional disk brake system.

SUMMARY OF THE INVENTION

The present invention provides a one-sided front swing arm suspension system for a motorcycle. In essence, the system includes a one-sided front swing arm that extends around one side of the front wheel; a front control arm; and a structural element designated herein as an upright. The wheel is journalled in cantilevered fashion to the lower end of the upright, which is in turn connected to both the swing arm and the control arm. A telescoping steering column connects the upright to a handlebar. Weight and shock loads transmitted between the motorcycle body and the front wheel are conveyed from the upright through the swing arm to the body of the motorcycle. The control arm functions to stabilize the angular orientation of the upright and the front wheel relative to the swing arm.

In more detail, the swing arm has a front end and a rear end, with the rear end being hinged to the body of the motorcycle for relative swinging motion in a vertical direction. The swing arm extends generally forwardly from the body and extends arcuately around one side of the front wheel. The control arm also has a front end and a rear end, with the rear end being hinged to the motorcycle body for relative swinging motion in a vertical direction. The control arm is positioned above the swing arm.

The upright is a single, integral structural member which is best described as having an integral upper arcuate portion and an integral lower portion. The lower portion is positioned entirely within the circumference of the wheel rim and generally extends at a rake angle along the steering radius of the front wheel. The front wheel is journalled to the upright by means of a cantilevered axle that extends from the front wheel hub and which is journalled in the lower end of the upright.

The upper arcuate portion of the upright extends around the upper portion of the wheel and terminates at a universal pivot joint, by which it is connected to the front end of the control arm. The front end of the swing arm is also connected by means of a universal pivot joint to the upright, at a position inside the inner circumference of the wheel rim.

The system further includes a telescopic steering column, which includes a steering shaft extending from the upper end of the arcuate portion of the upright, and a cooperably splined steering tube that is engaged with the steering shaft and which is pivotally connected at its upper end to a head frame that extends from the body of the motorcycle. A handlebar is affixed to the upper end of the steering tube just beneath the head frame.

The swing arm may be sprung and damped by means of a conventional spring/damper unit.

The brake disk, which is splined to the end of the wheel axle where it extends through the upright, is engaged by a hydraulic caliper brake unit that may be mounted to the upright.

These and other aspects of the present invention will be more apparent upon consideration of the following detailed description of the invention, when taken with the accompanying drawings.

BRIEF DESCRIPTION OF THE DRAWINGS

The Figures set forth in the accompanying drawings form a part of this specification and are hereby incorporated by reference. In the Figures.

Figure 1:
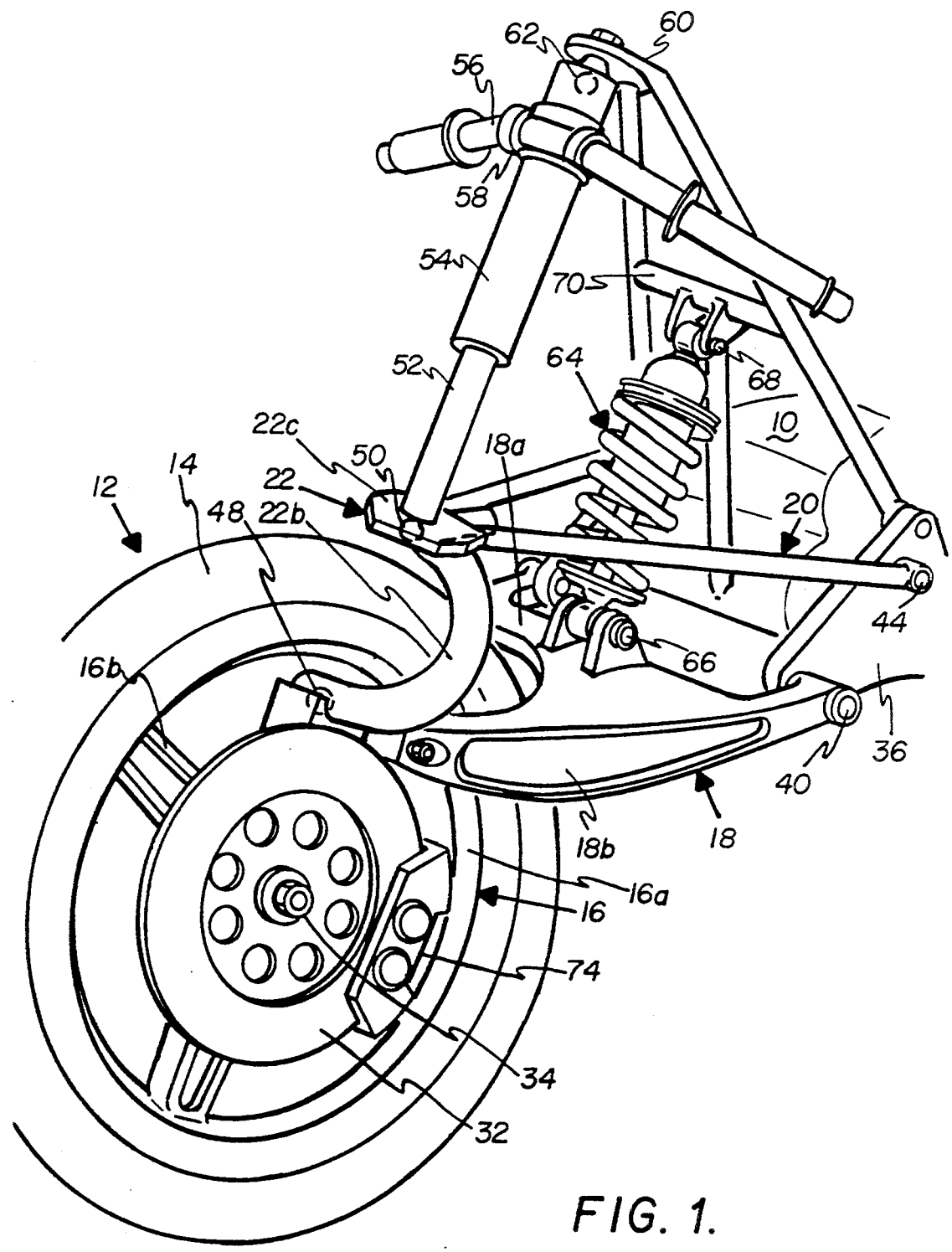
FIG. 1 is an isometric view of the front end of a motorcycle that is equipped with a preferred embodiment of the front swing arm suspension system of the present invention, all of which is illustrated in somewhat simplified schematic form in order to emphasize the primary structural elements.
Figure 2:
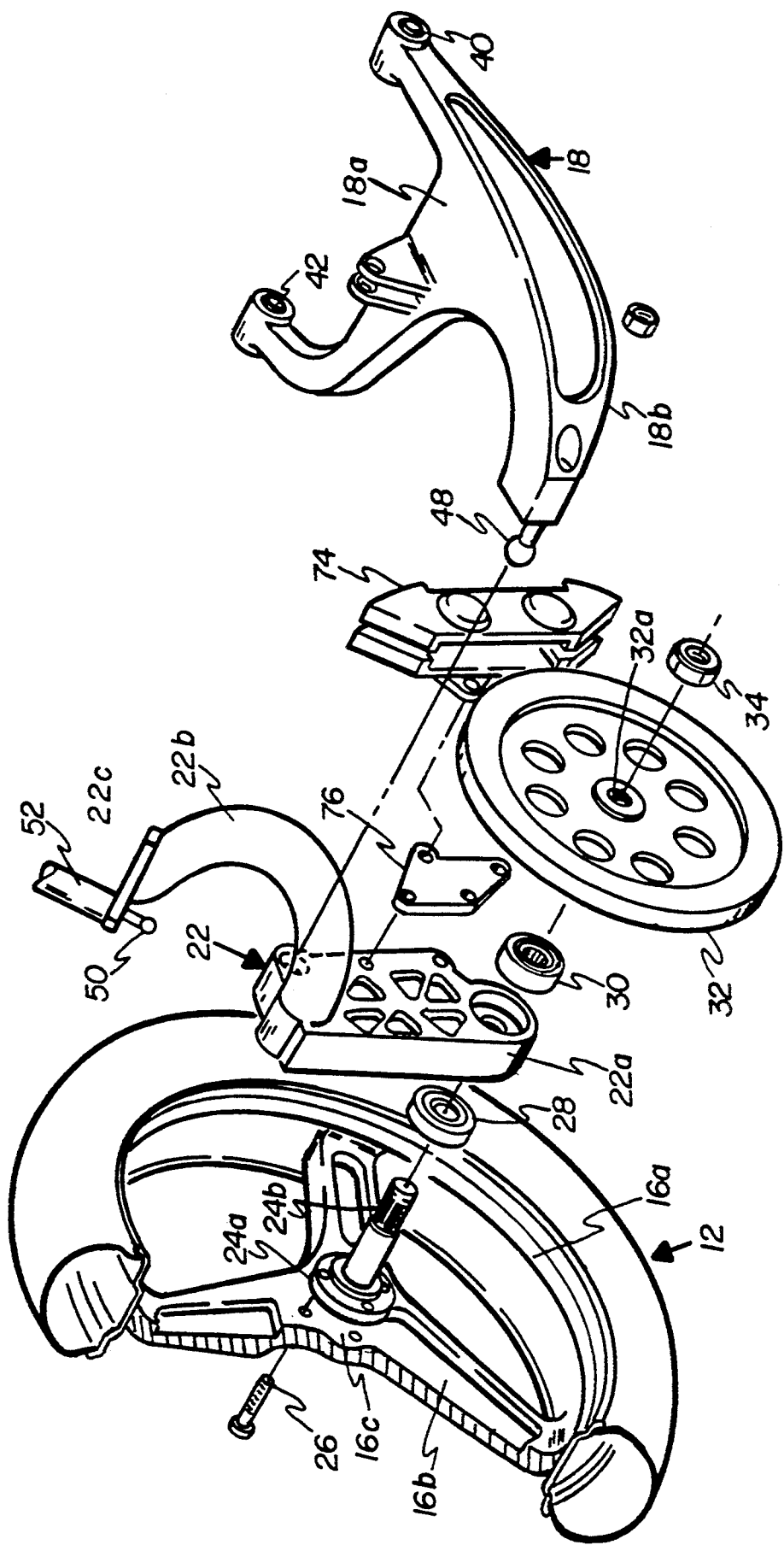
FIG. 2 is an exploded isometric view of the preferred embodiment illustrated in FIG. 1.

The preferred embodiment illustrated in the Figures is described in detail in the following detailed description of the invention.

Description of the Preferred Embodiment

Referring to the Figures, there is illustrated a motorcycle generally having a body 10 and a front wheel 12.

The motorcycle body 10 is illustrated in the Figures only in simplified schematic form. It should be understood that the motorcycle body 10 includes the engine and the associated structural and mechanical components that normally constitute the major portion of the overall weight and mass of the motorcycle. For the purposes of this description the particular details of the motorcycle body 10 are not essential. It is sufficient to note that the body 10 comprises the bulk of the motorcycle mass; that the body 10 includes the center of mass of the motorcycle; and that a primary object of the present invention is to convey weight and shock loads between the front wheel 12 and the center of mass of the motorcycle in as direct and mechanically efficient a path as possible.

The front wheel 12 includes a tire 14 and a cast alloy wheel 16 which includes an integral wheel rim 16a, wheel spokes 16b and a central hub portion 16c. It will be noted that the spokes 16b and the hub portion 16c are offset to the right (as viewed by a rider of the motorcycle) of the centerline of the front wheel 12, as further discussed below. In this regard, it will be noted that the centerline of the wheel tire 14 and wheel rim 16a is essentially the centerline of the motorcycle.

In accordance with the preferred embodiment of the present invention, that portion of the weight of the motorcycle which is borne by the front wheel 12 is transmitted to the front wheel 12 primarily through a one-sided front swing arm 18, which is pivotally attached to the motorcycle body 10. Swinging motion of the front wheel 12 and the swing arm 18 is controlled by an upper control arm 20. The swing arm 18 and control arm 20 each extend generally forwardly and slightly upwardly from the body 10 of the motorcycle.

Both arms 18 and 20 are attached to an upright 22, to which the front wheel 12 is journalled in a cantilevered fashion. The upright 22 is a structural, weight bearing element that transmits both weight and shock loads between the front wheel 12 and the swing arm 18, and which also transmits steering torque to the front wheel 12, as discussed further below.

The upright 22 may be generally described as having integrally connected lower and upper portions 22a and 22b, respectively. The lower portion 22a is positioned essentially entirely inside the inside perimeter of the wheel rim 16a. The lower portion 22a may be described as being in the form of a thick plate, and is illustrated in the Figures as having lightening holes for weight minimization purposes, which form no part of the invention. The upper portion 22b of the upright 22 is tubular. Upper portion 22b extends in an arcuate curve around the wheel tire 14 and terminates at its upper end in a mounting plate 22c which is integrally attached to the upper end of the upper portion 22b.

The front wheel 12 is journalled to the lower end of the lower portion 22a of the upright 22 by a live axle 24. The live axle 24 includes a flange 24a by which the axle 24 is bolted to the central hub portion 16c of the alloy wheel 16 by a set of bolts 26. The live axle 24 is journalled in bearings 28 and 30 which are set into bores in the opposite sides of the upright lower portion 22a. At the end of the axle 24 distal to the flange 24a are splines 24b, by which a brake disk 32 is affixed to the live axle 24 by splines 32a. The axle 24 and brake disk 32 are retained in position by an axle nut 34. It will be noted that the brake disk is located on the opposite side of the lower upright portion 22a from the wheel hub 16c, where it can be appropriately sized without being limited by the space constraints imposed by the shape and size of the wheel spokes 16b and wheel rim 16a.

The swing arm 18 includes a transverse portion 18a which extends approximately the width of the motorcycle body 10, and which is pivotally attached to a pair of frame chassis plates 36 and 38, which extend from the motorcycle body 10, by pivot pins 40 and 42, respectively. These pivot pins 40 and 42 allow the swing arm 18 to swing upwardly and downwardly in a vertical plane with respect to the upright motorcycle. The swing arm 18 also includes an arcuate forward section 18b which extends forwardly and around the left side of the front wheel 12 at a point just below the wheel rim 16a.

The upper control arm 20 is triangular in shape and is pivotally connected to the chassis plates 36 and 38 by pivot pins 44 and 46, respectively, which allow the upper control arm 20 to swing vertically with respect to the upright motorcycle.

The integral upper portion 22b of upright 22 is arcuate in shape and extends around the wheel rim 16a and the tire 14.

The forward end of the swing arm 18 is connected to the upright 22, at the upper end of its lower portion 22a, by a universally pivotable ball joint 48. The center of ball joint 48 is located on the main centerline that is common to the motorcycle, generally, and the front wheel 12 in particular. Further, the center of ball joint 48 is located approximately on the turning axis of the front wheel 12. It will be noted, from FIG. 3 for example, that the lower portion 22a of the upright 22 extends in a generally vertical orientation, with the arcuate upper portion 22b extending upwardly and rearwardly around the tire 14. This angular relationship between the lower portion 22a and the upper portion 22b, when viewed from the side, is utilized to provide space for the ball joint 48, which must be located on the steering axis of the front wheel, as discussed further below.

Similarly, the forward end of the control arm 20 is connected to the upright 22 at the upper end of its arcuate upper portion 22b. More specifically, the forward end of the control arm 20 is connected to the integral mounting plate 22c, by a universally pivotable ball joint 50, which depends from the lower side of the mounting plate 22c. The center of ball joint 50, like ball joint 48, is located on the center line of the motorcycle and also on the steering axis of the front wheel 12.

Ball joint 48 is somewhat larger in size than ball joint 50, since the function of ball joint 48 is to convey the majority of the weight and shock loads borne by the front wheel 12 to the motorcycle body 10, through swing arm 18; whereas the function of the upper ball joint 50 is primarily to control the angular orientation of upright 22 with respect to the swing arm 18.

Extending upwardly and rearwardly along the steering axis from the upper end of the upright 22 is a steering shaft 52. The upper end of the steering shaft 52 is splined and is engaged in a cooperably splined steering tube 54, by splines 54a, to allow for relative telescoping movement of the steering shaft 52 within the steering tube 54. A handlebar 56 is rigidly affixed to the steering tube 54 by a clamp 58. The upper end of the steering tube 54 is stabilized by a head frame 60. More particularly, the upper end of the steering tube 54 is connected to the head frame 60 by a universally pivotable ball joint 62 which enables the steering tube 54 to be rotated about its longitudinal axis during steering and which also allows the steering tube 54 to undergo limited swinging motion in a vertical plane. It will be noted that the handlebar 56 is clamped to the steering tube 54 at a point beneath the head frame 60, in contrast to conventional steering systems in which the handlebar is located above the head frame assembly.

The swing arm 18 is sprung and damped by a spring-/damper unit which in the preferred embodiment is a spring-loaded shock absorber 64. The lower end of the shock absorber 64 is pivotably connected to the transverse portion 18a of the swing arm 18 by a pivot pin 66. The upper end of the shock absorber 64 is connected by a pivot pin 68 to a transverse frame member 70 that is part of the motorcycle body 10. The shock absorber 64 is centered on the common center line of the motorcycle and the front wheel 12.

The suspension system further includes a conventional hydraulic caliper brake 74 which is rigidly affixed to the lower portion 22a of the upright 22 by a mounting bracket 76, and which is operable to engage the brake disk 32.

Having described the structure of a preferred embodiment of the invention, the operation of the preferred embodiment will now be addressed.

First, however, it should be appreciated that although the swing arm 18 and control arm 20 are described and illustrated here as being hinged to "chassis plates" 36 and 38 of the motorcycle body, modern motorcycles are constructed with a variety of structural frame and engine components, some of which are sometimes integrally combined. That is, in some cases the engine itself functions as a structural element of the motorcycle, so as to achieve efficiencies of construction and performance with lighter weight construction. Accordingly, it should be understood that the swing arm 18 and/or the control arm 20 may be hinged to any suitable structural element of the motorcycle, so long as the structural elements are of adequate load-bearing capacity to support the operations of the arms.

It will be noted that in the resting position of the suspension system, the three ball joints 48, 50 and 62 define an approximate steering axis, about which the front wheel 12 rotates during steering. It will be further noted that the axis of the front axle 24 is positioned slightly forward of this steering axis, in order to provide a small steering bias, as is ordinarily designed into all motorcycles.

Figure 3:
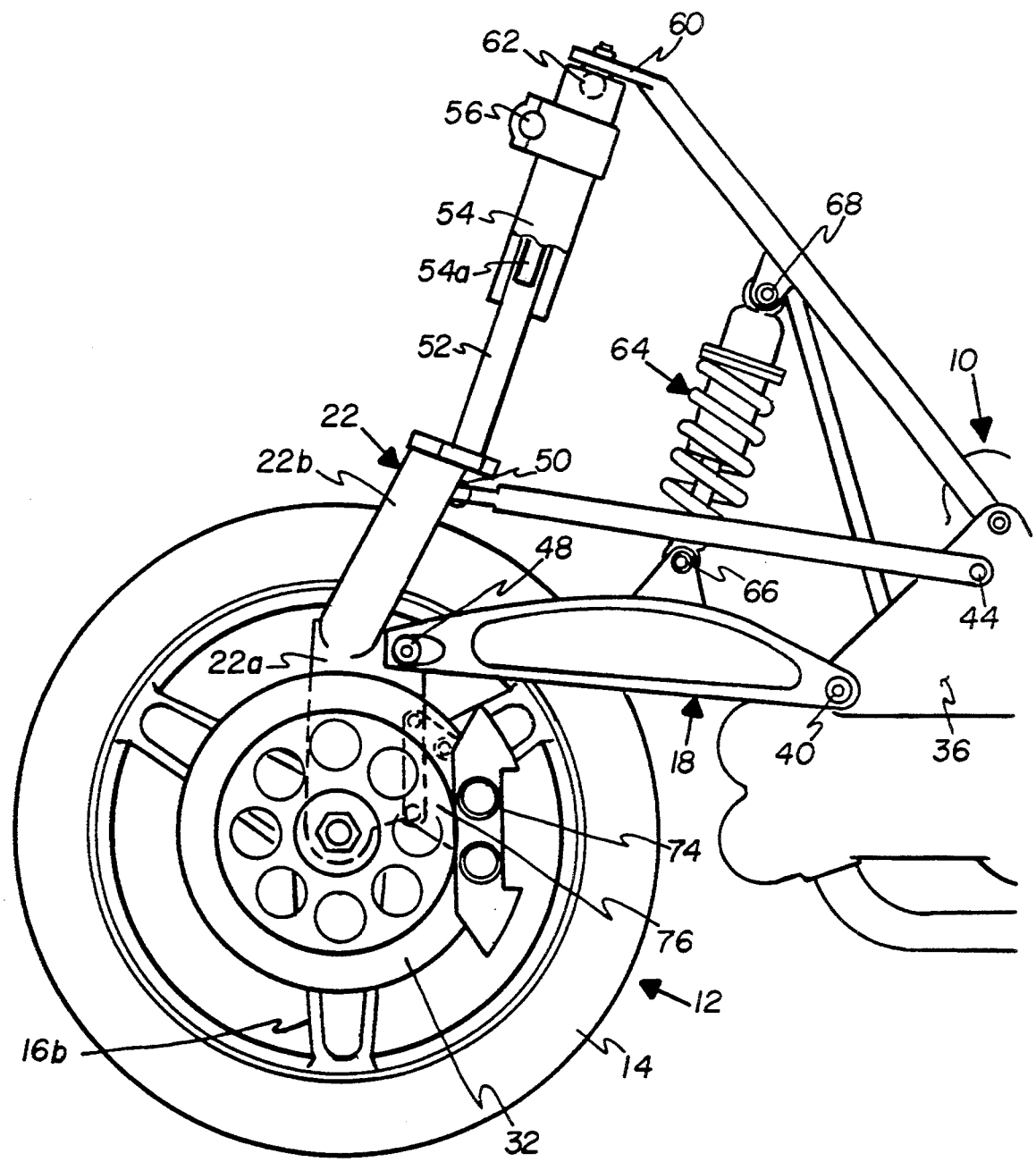
FIG. 3 is a side view of the preferred embodiment illustsated in FIGS. 1 and 2.
Figure 4:
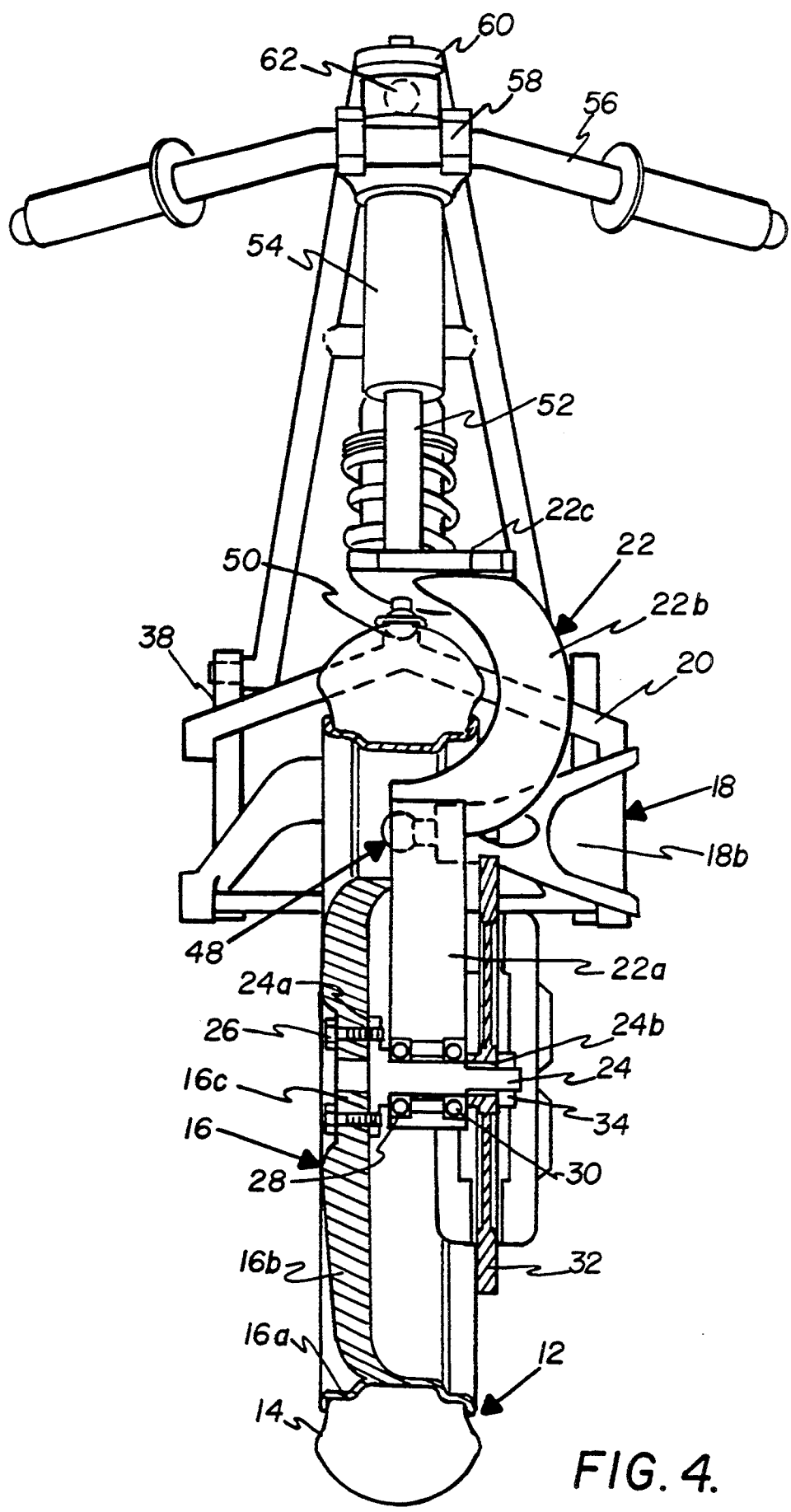
FIG. 4 is an end view of the preferred embodiment illustrated in FIGS. 1 through 3.
Figure 5:
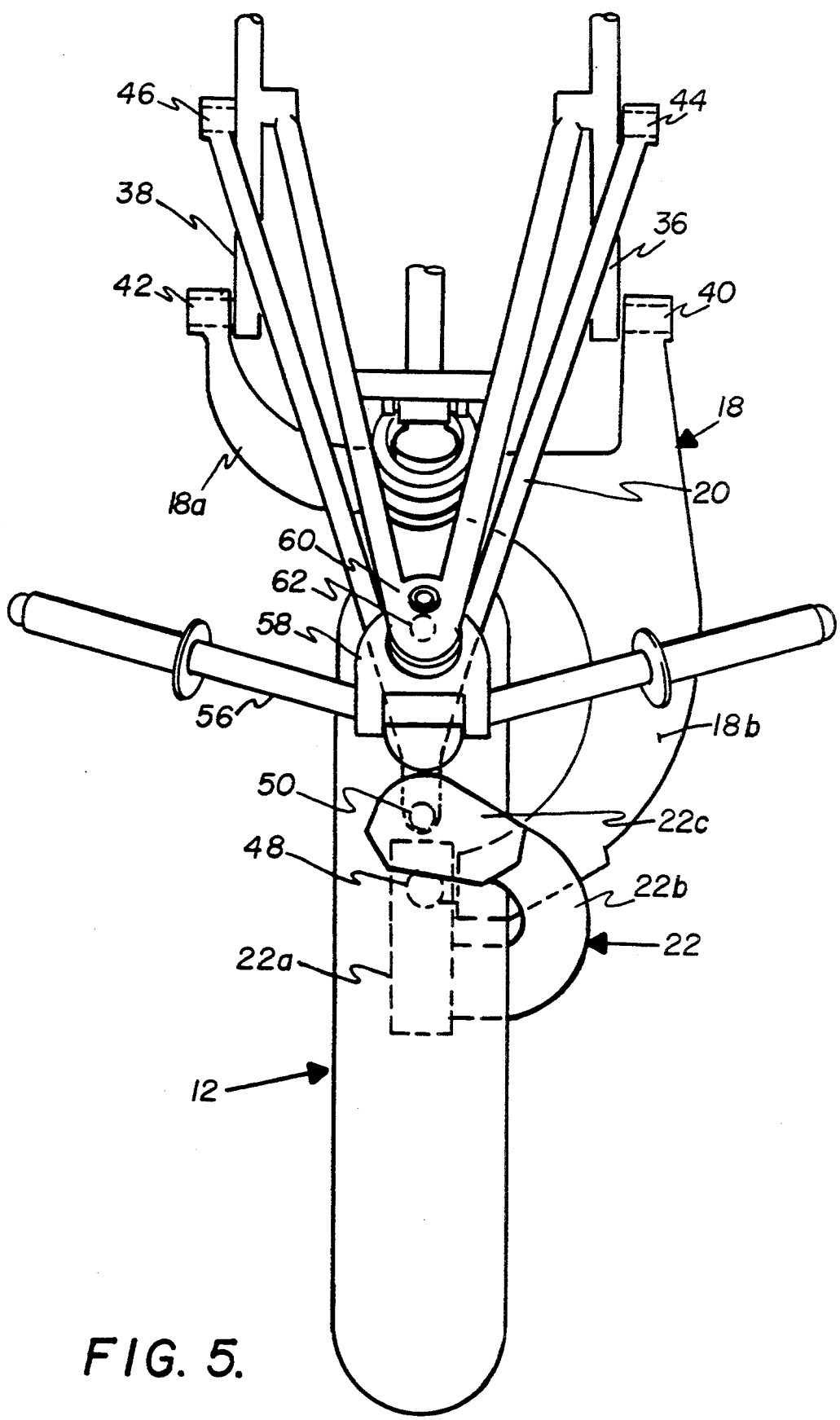
FIG. 5 is a plan view of the preferred embodiment illustrated in FIGS. 1 through 4.

It will be noted from FIG. 3 that the pivot pins 40, 42, 44 and 46, which together with the ball joints 48 and 50 define the functional ends of the control arm 20 and the swing arm 18, do not form a pure geometric parallelogram when viewed from the side, as a result of the control arm 20 being slightly longer than the swing arm 18. It will also be noted that the rear pivot pins 40 and 42, and 44 and 46, are positioned slightly lower than their corresponding ball joints 48 and 50, respectively. This arrangement results in a system whereby, at least over the limited range of swinging motion permitted of the front wheel 12, the front wheel 12 moves primarily upwardly but also slightly rearwardly in response to a road shock, for example in response to a modest bump or pothole; that is, a bump or pothole that is of a size that is less than approximately half the radius of the front tire.

This arrangement achieves the desired and most optimum result, since the moment of force on the front wheel resulting from common road shocks has a small rearward component and a relatively larger upward component. Consequently, the upward and rearward components of force resulting from commonly encountered road shocks are borne by proportionate upward and rearward displacements of the front wheel. This is of course the principle commonly applied in conventional forked front suspension systems. By the arrangement of the present invention, a similar result is obtained in a single sided front swing arm suspension.

It will also be noted that this geometric arrangement results in the upright 22 and steering shaft 52 remaining in substantial alignment with the telescoping steering tube 54 during suspension travel.

The primary advantage attendant to the present swing arm suspension, as compared to a comparable fork suspension, is that the shock load is transmitted directly through the swing arm 18 to the motorcycle body 10, close to the center of mass of the motorcycle, and without being transmitted through the fork and the steering head of the conventional motorcycle. Because all weight and shock loads are transmitted directly through the swing arm 18 to the body 10, the steering head frame 60 and associated structures can be made considerably smaller and lighter, with the only function of the head frame 60 being to locate the upper end of the steering tube 54. Conversely, the steering shaft 52 and the steering tube 54 do not bear any significant weight or shock loads, and their function is solely to enable steering of the front wheel by transmitting steering torque from the handlebar 56 to the front wheel 12. Consequently the steering shaft 52, tube 54 and supporting structures can be made smaller and lighter. With this arrangement, the steering function and the load bearing functions of the front suspension system are separated, much as they are in an automobile, and there are thereby achieved many of the same advantages in ride quality, safety and performance.

It will further be noted that the swing arm 18 is positioned relatively high with respect to the front wheel 12, where the range of rotational motion of the front wheel 12 during steering is smaller. The consequence of this positioning is that the arcuate portion 18b of the swing arm 18 can be made relatively smaller, and hence lighter, than in the inventor's previous suspension system disclosed in the U.S. Pat. No. 4,526,249.

Alternatively, if desired, the arcuate portion 18b of the swing arm 18 can be designed relatively larger than illustrated herein in connection with the preferred embodiment, so as to allow a greater range of steering motion than permitted by a comparably sized swing arm constructed in accordance with the invention disclosed in U.S. Pat. No. 4,526,249. This would be desirable, in motorcycle applications requiring a maximum range of turning, i.e. a minimum turning radius, for example in off-road motorcycles.

Yet another significant aspect of the present invention is that the upright 22 is located between the brake disk 32 and the wheel spokes 16b. That is, the brake disk 32 is located on the opposite side of the upright 22 from the wheel spokes 16b. In the suspension system disclosed in the previous U.S. Pat. No. 4,526,249, the brake disk and wheel spokes are both located on the same side of a kingpin, which is similar in function to the upright 22 of the present invention. In the present invention, the advantage of locating the brake disk 32 on the opposite side of the upright 22 is that upright 22 can be constructed more compactly and can be located essentially along the steering axis of the front wheel.

The present invention is described and illustrated herein with reference to a preferred embodiment. Nevertheless, it should be understood that various modifications, alterations and substitutions may be apparent to one of ordinary skill in the art, and that such modifications, alterations and substitutions may be made without departing from the essential invention.

Accordingly, the present invention is defined only by the following claims.

The embodiments of the invention in which patent protection is claimed are:

1. In a motorcycle having a motorcycle body and a front wheel, a one-sided front swing arm suspension system comprising:
   a front swing arm having a front end and a rear end, said rear end being hinged to said body of said motorcycle for relative swinging motion in a vertical plane with the motorcycle in an upright position, said swing arm extending generally forwardly from said body and extending arcuately around one side of said front wheel;
   a control arm having a front end and a rear end, said rear end of said control arm being hinged to said motorcycle body for relative swinging motion in a vertical plane, said control arm being positioned above said front swing arm and extending generally forwardly from said motorcycle body;
   an upright having an integral upper arcuate portion and an integral lower portion, said lower portion having an upper end and a lower end, said lower portion being positioned inside the circumference of said front wheel, said upper arcuate portion having an upper end and a lower end, said lower end of said upper arcuate portion being integrally connected to and extending from said upper end of said lower portion of said upright, said upper arcuate portion being arcuate in shape and extending around said front wheel;
   said front wheel including a cantilevered axle extending from said wheel, said cantilevered axle being journalled to said lower end of said lower portion of said upright, said cantilevered axle being a live axle which is affixed to said wheel and which is splined to a brake disk positioned on the opposite side of said upright from said wheel;
   said front end of said control arm being connected for universal pivotal motion to said upper end of said upper arcuate portion of said upright, and said front end of said swing arm being connected for universal pivotal motion to said upper end of said lower portion of said upright;
   a telescopic steering column affixed to and extending from said upper end of said upper arcuate portion of said upright, and a handlebar affixed to said telescopic steering column; and
   means for springing and damping swinging motion of said swing arm, said control arm, said upright and said front wheel, so as to bear weight and shock loads imposed on said front wheel.

2. The one-sided front swing arm suspension system defined in claim 1 wherein said telescopic steering column includes a steering shaft affixed to and extending from said upper end of said upper portion of said upright, said steering shaft extending into and being splined to a steering tube, said steering tube having a handlebar affixed thereto, and said steering tube having an upper end connected for universal pivotal motion to a head frame extending from said motorcycle body.

3. The one-sided front swing arm suspension system defined in claim 1 wherein said swing arm includes an integral transverse portion which extends the width of said motorcycle body, and wherein said means for springing and damping swinging motion of said swing arm includes a spring loaded shock absorber having upper and lower ends, said lower end of said shock absorber being pivotally connected to said transverse portion of said swing arm and said upper end of said shock absorber being pivotally connected to said body of said motorcycle.

4. The one-sided front swing arm suspension system defined in claim 2 wherein said upper end of said upper arcuate portion of said upright terminates in an integral mounting plate from which said steering shaft extends, and further including a universally pivotable ball joint to which said front end of said control arm is pivotally attached.

5. The one-sided front swing arm suspension system defined in claim 4 further including a hydraulic caliper brake mounted to said upright and positioned to engage said brake disk.

6. The one-sided front swing arm suspension system defined in claim 2 wherein said steering column is disposed at a steering column angle, and wherein the lengths of said control arm and said swing arm are sized to as to result in swinging motion of said upright during suspension travel which maintains said steering column angle of said steering column substantially aligned with said upper end of said steering tube.

7. In a motorcycle having a motorcycle body and a front wheel, a one-sided front swing arm suspension system comprising:

a front swing arm having a front end and a rear end, said rear end being hinged to said body of said motorcycle for relative swinging motion in a vertical direction, said swing arm extending generally forwardly from said body and extending arcuately around one side of said front wheel;

a control arm having a front end and a rear end, said rear end of said control arm being hinged to said motorcycle body for relative swinging motion in a vertical direction, said control arm being positioned above said front swing arm and extending generally forwardly from said motorcycle body;

an upright having an integral upper arcuate portion and an integral lower portion, said lower portion having an upper end and a lower end, said lower portion being positioned inside the circumference of said front wheel, said upper arcuate portion having an upper end and a lower end, said lower end of said upper arcuate portion being integrally connected to and extending from said upper end of said lower portion of said upright, said upper arcuate portion being arcuate in shape and extending around said front wheel;

said front wheel including a cantilevered axle extending from said wheel and through said upright, said cantilevered axle being journalled to said lower end of said lower portion of said upright;

a brake disk splined to said axle on the opposite side of said upright from said wheel;

a brake caliper affixed to said upright and positioned to engage said brake disk;

said front end of said control arm being connected for universal pivotal motion to said upper end of said upper arcuate portion of said upright, and said front end of said swing arm being connected for universal pivotal motion to said upper end of said lower portion of said upright;

a telescopic steering column affixed to and extending from said upper end of said upper arcuate portion of said upright, and a handlebar affixed to said telescopic steering column; and means for springing and damping swinging motion of said swing arm, said control arm, said upright and said front wheel, so as to bear weight and shock loads imposed on said front wheel.

8. The one-sided front swing arm suspension system defined in claim 7 wherein said telescopic steering column includes a steering shaft affixed to and extending from said upper end of said upper portion of said upright, said steering shaft extending into and being splined to a steering tube, said steering tube having a handlebar affixed thereto, and said steering tube having an upper end connected for universal pivotal motion to a head frame extending from said motorcycle body.

9. The one-sided front swing arm suspension system defined in claim 7 wherein said swing arm includes an integral transverse portion which extends the width of said motorcycle body, and wherein said means for springing and damping swinging motion of said swing arm includes a spring loaded shock absorber having upper and lower ends, said lower end of said shock absorber being pivotally connected to said transverse portion of said swing arm and said upper end of said shock absorber being pivotally connected to said body of said motorcycle.

10. The one-sided front swing arm suspension system defined in claim 8 wherein said upper end of said upper arcuate portion of said upright terminates in an integral mounting plate from which said steering shaft extends, and further including a universally pivotable ball joint to which said front end of said control arm is pivotally attached.

11. The one-sided front swing arm suspension system defined in claim 8 wherein the lengths of said control arm said swing arm are sized so as to result in swinging motion of said upright during suspension travel which maintains the angle of said steering column substantially aligned with said upper end of said steering tube.

12. The one-sided front swing arm suspension system defined in claim 8 wherein said handlebar is affixed to said steering tube at a point beneath said head frame.

13. The one-sided front swing arm suspension system defined in claim 7 wherein said front wheel includes a tire and a cast wheel including an integral wheel rim, wheel spokes and wheel hub, and wherein said wheel includes a centerline centered on said tire and said wheel rim, and wherein said wheel spokes and said wheel hub are offset from said centerline of said front wheel, and wherein said lower portion of said upright is located substantially entirely within the inside perimeter of said wheel rim.

14. The one-sided front swing arm suspension system defined in claim 7 wherein said upper arcuate portion of said upright includes a mounting plate integrally affixed to said upper end of said upper arcuate portion, said mounting plate including a ball depending downwardly therefrom to which said forward end of said control arm is affixed for universal pivotal motion.

15. The one-sided front swing arm suspension system defined in claim 7 wherein said wheel axle is journalled in bearings set into opposite sides of said lower end of said lower portion of said upright.

16. The one-sided front swing arm suspension system defined in claim 7 wherein said means for springing and damping said swing arm includes a spring loaded shock absorber extending between said swing arm and said motorcycle body.

* * * * *